United States Patent [19]

Cotter et al.

[11] Patent Number: 5,407,067
[45] Date of Patent: Apr. 18, 1995

[54] COMPACT DISK CARRYING CASE

[76] Inventors: Betsey J. Cotter; John R. Cotter, both of 270 No. Cannon Dr., Beverly Hills, Calif. 90210

[21] Appl. No.: 150,485
[22] Filed: Nov. 10, 1993
[51] Int. Cl.$^6$ ............................................. B65D 85/30
[52] U.S. Cl. ..................................... 206/312; 493/946
[58] Field of Search ............... 206/309, 310, 311, 312, 206/313; 493/946

[56] References Cited

U.S. PATENT DOCUMENTS

| D. 268,190 | 3/1983 | Nast | 206/312 X |
|---|---|---|---|
| D. 303,042 | 8/1989 | Mackey | 206/312 X |
| D. 319,345 | 8/1991 | Rayburn | 206/312 X |
| D. 323,428 | 1/1992 | Wang | 206/312 X |
| 4,850,731 | 7/1989 | Youngs | 206/312 X |

Primary Examiner—William I. Price
Attorney, Agent, or Firm—Spensley Horn Jubas & Lubitz

[57] ABSTRACT

A folding compact disk carrying case foldable about a center thereof to define interior right and left surfaces and including a plurality of pockets in the interior surfaces. Each of the pockets has an opening and a depth shorter than the diameter of each of the compact disks to allow a top portion of each of the compact disks to extend beyond the opening. A transparent flexible sheet is connected to a lip of each of the pockets for covering the top portion of each of the compact disks extended beyond the opening of each of the pockets. As a result, while the top portion of each compact disk is extended outside of each pocket for easy and quick access and removal of the compact disk, the transparent flexible sheet covering the top potion protects the surface of the compact disk and yet allows a quick recognition of the compact disk.

24 Claims, 9 Drawing Sheets

COMPACT DISK CARRYING CASE

BACKGROUND OF THE INVENTION

1. Field of the Invention

The present invention relates to compact disk carrying cases for storing and carrying a plurality of compact disks and methods of making the same, and in particular embodiments, to folding compact disk carrying cases and a method of making the same, wherein the cases are formed of a plurality of individual layers of material configured to be readily assembled and bonded together with a single stitching (or other suitable bonding) operation.

2. Description of Related Art

A variety of compact disk carrying cases have been developed to store and transport compact digital audio disks or compact disks. A compact disk (or other optical disk storage device) generally has an optical surface which stores audio digital data and a printed surface which carries indicia, e.g., for the identifying the stored data.

A common problem associated with compact disk (or other optical disk) storage devices is that the data retrieving quality may be adversely affected by scratches and/or dust accumulated on the optical surface. Accordingly, disk carrying cases have been designed with a plurality of casings or storage spaces, each provided with a protective lining for contacting the optical surface of a stored disk.

For example, U.S. Pat. No. 4,850,731, issued to Youngs employ a protective lining 26 of nonwoven fabric. Within each storage pocket of a multiple storage pocket device for storing a plurality of compact disks. Youngs' compact disk carrying device is generally configured in a note book shape, with a plurality of pages or leaves defining storing casings or pockets stacked one on top of the other.

While Youngs' compact disk carrying case is capable of carrying many compact disks, a user is not able to see the printed surface of all of the stored disks at a glance. As a result, the user may have to flip through page after page to find a desired one of the compact disks stored therein. This process may be undesirable, for example, in a situation wherein the user is operating a motor vehicle and wishes to select a compact disk to insert into the vehicles disk playing device.

In addition, each of Youngs' plural pages or leaves is formed of multiple layers of materials bonded together. Youngs' device, thus, requires a relatively large number of bonding steps, which could result in relatively high manufacturing costs. Various other multiple page disk storage devices, such as described in U.S. Pat. No. Des 319,345, to Rayburn, or U.S. Pat. No. Des 323,428, to Wang, suffer from similar problems.

SUMMARY OF THE DISCLOSURE

It is an object of the present invention to provide an improved disk carrying case and a method of making the same which can accommodate and protect a plurality of disks, such as compact disks or other disk-type data storage devices.

It is another object of embodiments of the present invention to provide a folding compact disk carrying case, and a method of making the same, which protects the optical surface of a plurality of stored disks from dust and scratches and, yet allows a user to readily view the plurality of stored disks at a glance.

It is a further object of embodiments of the present invention to provide a compact disk carrying case and a method of making the same, which has a plurality of pockets for receiving a plurality of disks and facilitates easy insertion and removal of the disks.

It is a further object of embodiments of the present invention to provide a folding compact disk carrying case and a method of making thereof which facilitates the manufacturing process of a folding compact disk carrying case by allowing the disk carrying pocket structure to be formed with a minimal number of bonding or stitching steps, and, in preferred embodiments, with a single bonding or stitching step.

These and other objects are achieved, according to a preferred embodiment of the present invention, in a folding compact disk carrying case including a rectangular member having therein a central folding line to define a left flap and a right flap. The left and right flap have a plurality of pockets in their respective internal surfaces. As will be discussed in greater detail below, each pocket has an opening and a depth shorter than the diameter of each of the compact disks. Thus, when a disk is inserted in a pocket, the disk will partially extend out of the opening. Each pocket is provided with a transparent flexible sheet for covering the disk portion extended beyond the pocket opening. As a result, while the top portion of each disk is extended outside of each pocket for easy and quick access and removal, the transparent flexible sheet helps protect the surface of the disk and, yet, allows the user to readily view at least a portion of the printed surface of the disk.

In preferred embodiments, a folding compact disk case is formed of a plurality of shaped layers of materials which are configured to properly align and assemble with one another, e.g., via a series of tab and slot arrangements. When so aligned, the configuration of the individual layers allows the layered assembly to be bonded with a single stitching (or other suitable bonding) operation. Thus, the case may be manufactured according to a relatively simple process comprising, cutting sheets of materials to be layered into desired patterns, arranging the patterned layers and interlocking the tabs and slots in adjacent layers to form a layered assembly, and stitching (or otherwise bonding) the layered assembly in a single stitching (or other bonding) operation.

DETAILED DESCRIPTION OF PREFERRED EMBODIMENTS

Figure 1:
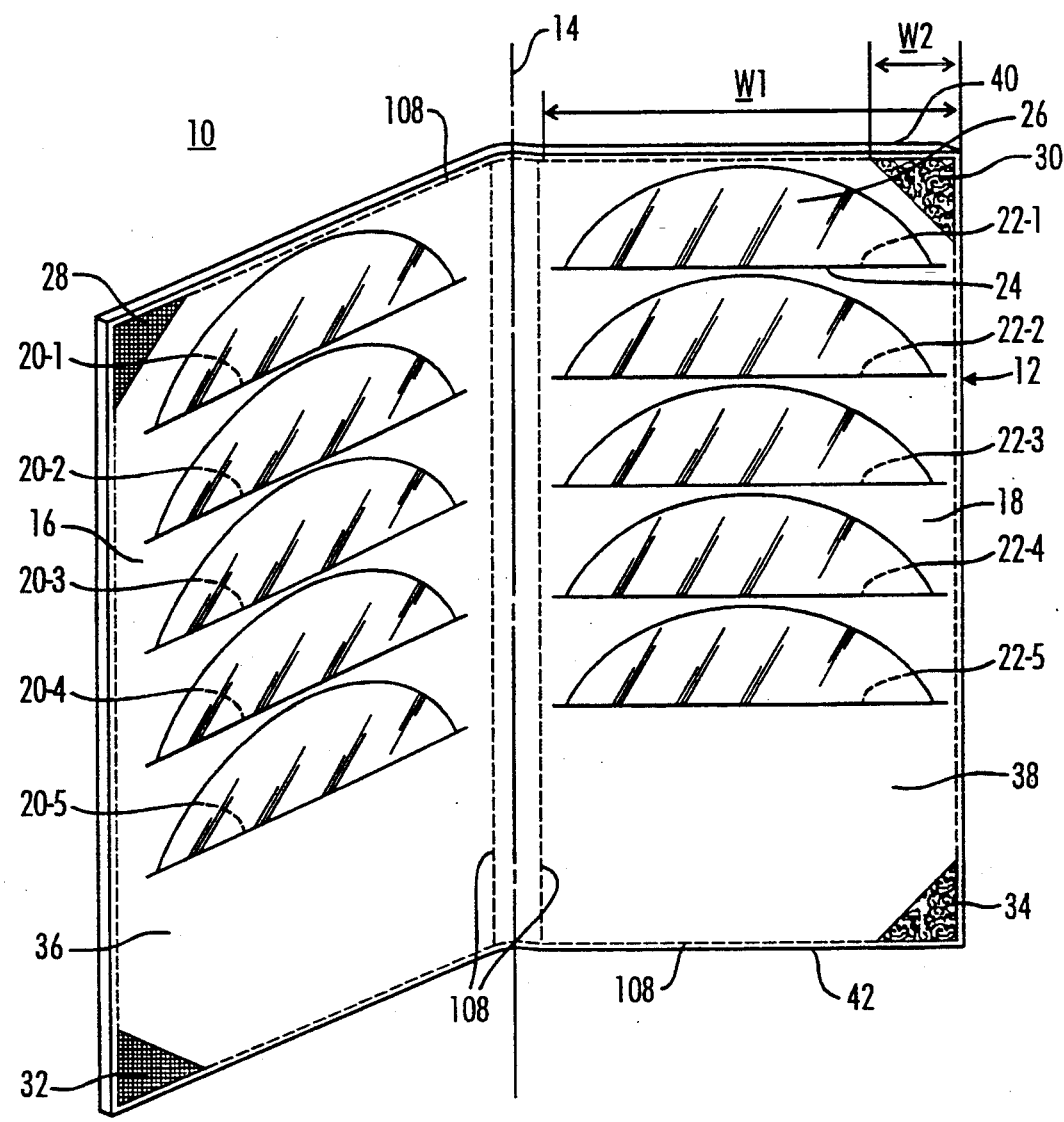
FIG. 1 is a perspective view of a folding compact disk carrying case in accordance with one embodiment of the present invention.

A folding compact disk carrying case in accordance with a preferred embodiment of the present invention is indicated generally at 10. The case 10 comprises a generally rectangular main body 12 which can be folded about a central folding axis 14. The main body defines first and second flaps 16 and 18, shown as a left flap 16 and a right flap 18 in FIG. 1.

Each flap 16 and 18 is provided with a plurality pockets 20 and 22, respectively, for receiving and storing a corresponding plurality of compact disks. In the illustrated embodiment, a set of five pockets 20-1 to 20-5 are provided in the left flap 16 and another set of five pockets 22-1 to 22-5 are provided in the right flap 28. However, other embodiments may be provided with any suitable number of pockets 20 and 22. In further embodiments, the pockets 20 in the left flap 16 and the pockets 22 in the right flap 18 may be arranged so that these pockets respectively oppose each other when the carrying case 10 is closed.

Each of the pockets 20 and 22 has an opening 24 through which a compact disk may be inserted into the pocket interiors. The opening 24 has a width w1 slightly wider than the diameter of the compact disk to allow the widest portion of the compact disk to be received within the pocket. In preferred embodiments, the width w1 is chosen to provide a snug fit to securely hold the compact disk in the pocket. Each of the pockets 20 and 22 has a depth less than the diameter of a compact disk so that the upper portions of stored compact disks extend out of the openings 24. In a preferred embodiment, each of the pockets 20 and 22 has a depth less than the diameter of a compact disk, but greater than the radius of a compact disk.

To protect the surfaces of the compact disks extending outside of the pockets 20 and 22, each of the pockets 20 and 22 is provided with a cover sheet 26. The cover sheet 26 has a surface area sufficient to cover the entire area of the portion of the compact disk extending outside each pocket 20 and 22. In preferred embodiments, the cover sheet 26 is made of vinyl, polyethylene, or other transparent flexible plastic materials to allow a user to see indicia on the compact disk through the cover sheet 26.

In the illustrated embodiment, the pockets 20-1 to 20-5 in the left flap 16 are vertically spaced from each other so that the cover sheets 26 of adjacent pockets do not overlap with each other. The pockets 22-1-22-5 in the right flap 18 are vertically spaced in a similar manner. As a result, when a respective compact disk is accommodated in each of the pockets 20 and 22, the compact disks are vertically staggered, in a partially overlapping manner, with an upper portion of each compact disk extending outside of its respective pocket so as to be viewable through a transparent cover sheet 26 and readily accessible by a user. Consequently, a user can readily identify and retrieve a desired one of the compact disks at a glance when the carrying case 10 is opened.

The case 10 can be folded about a centrally located axis 14. A fastening system is provided for securely maintaining the left flap 16 and the right flap 18 folded together in a closed position. In one embodiment, hook and loop pads 28 and 30, such as Velcro (a trademark) fastening tapes, are attached to the corners of the left flap 16 and the right flap 18, respectively. When the case 10 is folded closed, with internal surfaces 36 of the left flap 16 and the right flap 18 facing each other, the upper hook and loop pads 28 and 30 and the lower hook and loop pads 32 and 34 engage with each other and secure the flaps together. In further embodiments, the hook and loop pads 28 and 30 may extend along a top edge 40 of the carrying case 10 by a width w2 sufficient to inhibit stored disks from slipping out of the case, between the upper edges of the flaps 16 and 18, when folded closed. The lower hook and loop pads 32 and 34 preferably extend along a lower edge 42 of the carrying case 10 in a similar manner as the upper hook and loop pads 28 and 30.

Figure 2:
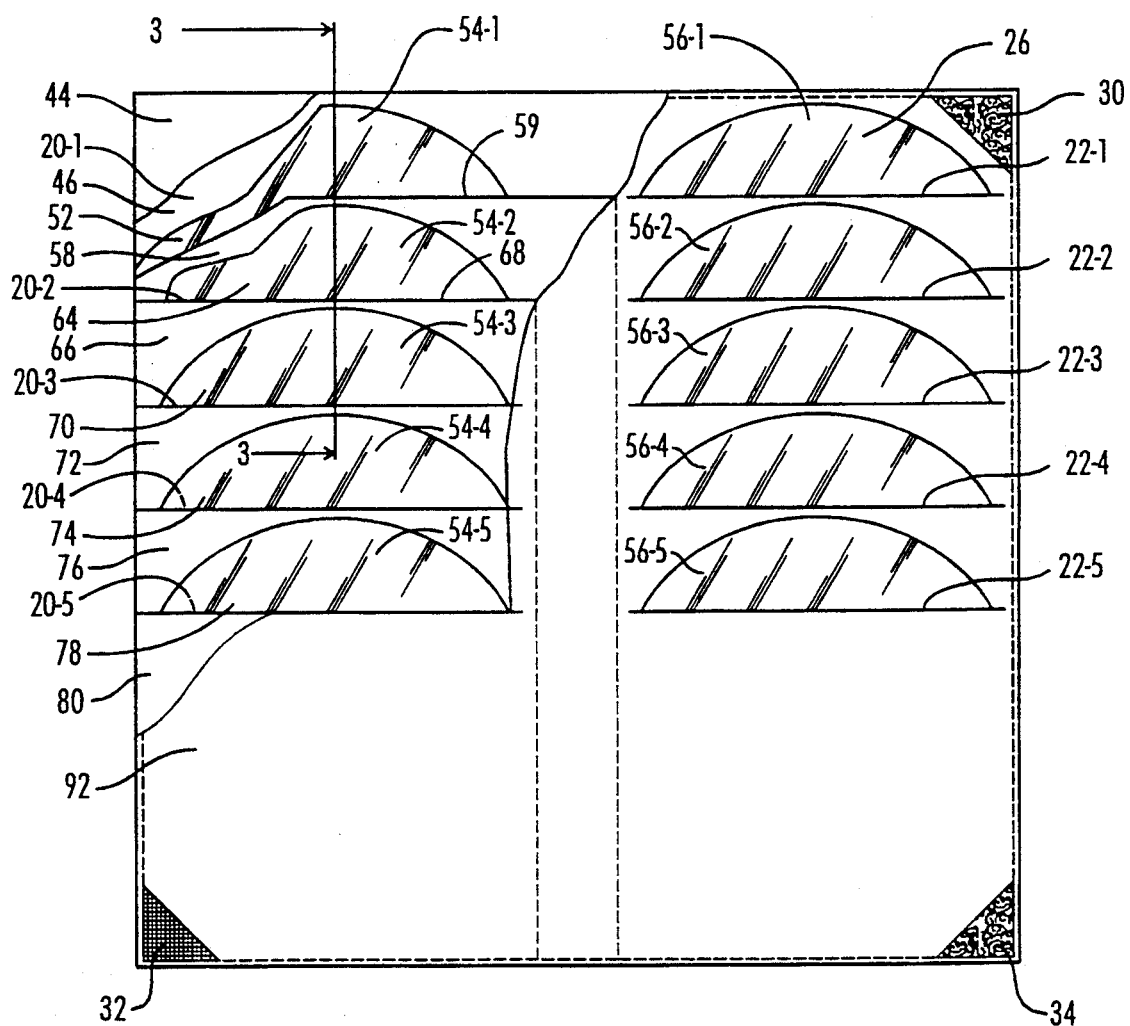
FIG. 2 is a front view of the folding compact disk carrying case of FIG. 1 in an opened position and with a portion of various layers of the case removed.
Figure 3:
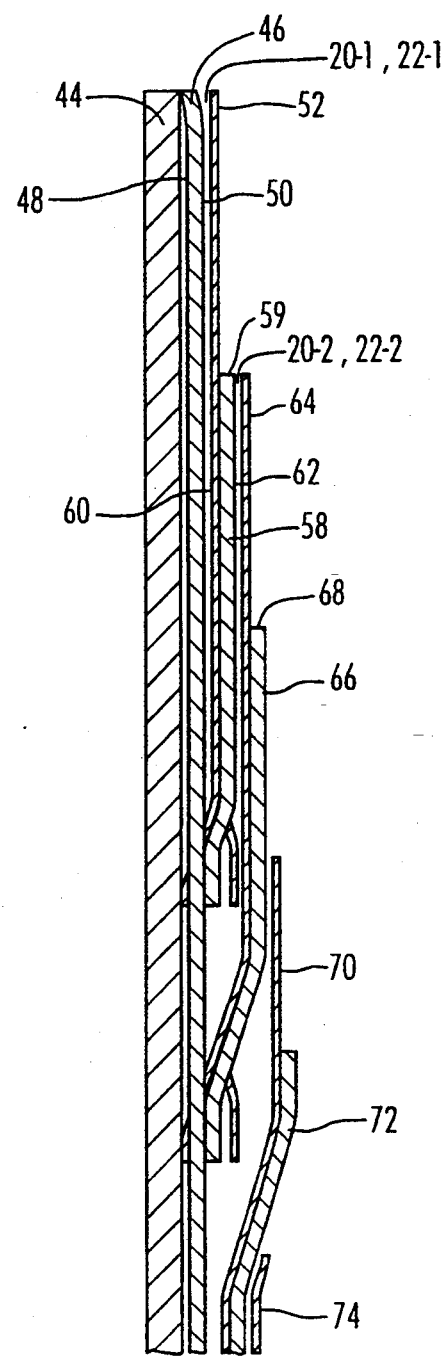
FIG. 3 is a cross-sectional view of the folding compact disk carrying case of FIG. 2, viewed along the lines 3—3.
Figure 4:
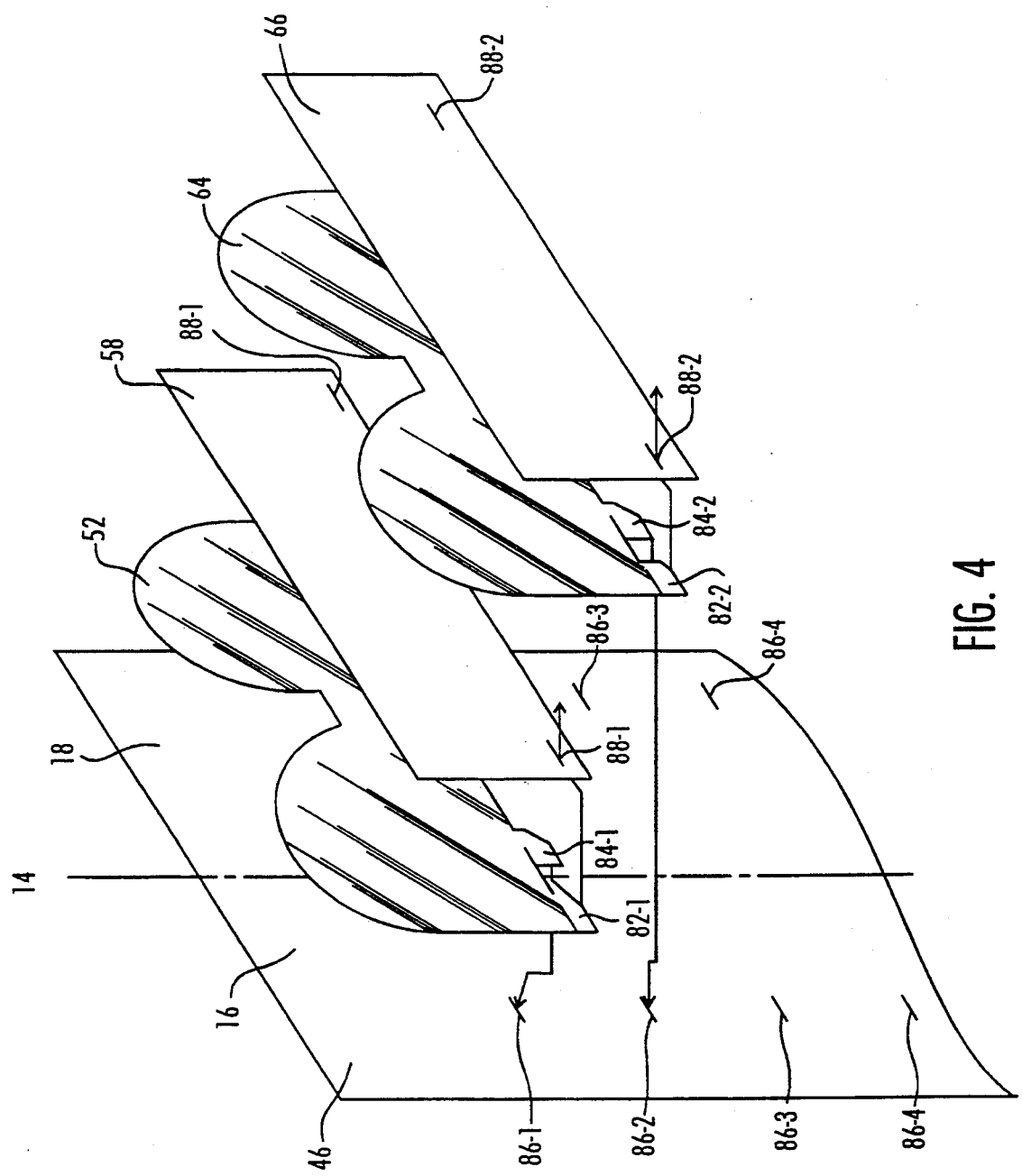
FIG. 4 is a perspective exploded view illustrating layers of components (a flexible base sheet, a first transparent cover sheet and first flexible sheet strip and a second transparent cover sheet and second flexible sheet strip) of the folding compact disk carrying case of FIG. 1.

The case 10 is formed of multiple layers of materials, as shown in FIG. 2 and FIG. 3. The carrying case 10 has a backing sheet 44 which is generally rectangular in shape. The backing sheet 44 is made from a semi-rigid material, such as for example vinyl, leather and synthetic leather, with enough flexibility, at least at the axis 14, to be folded.

A flexible base sheet 46 is disposed adjacent the backing sheet 44. The flexible base sheet 46 has a shape and a size which generally conforms to the shape and size of the backing sheet 44 and, therefore, covers substantially the entire surface of the backing sheet 44. The flexible base sheet 46 should preferably be made from a soft material such as polyester nonwoven fabric, felt or other lint-free materials. Typically, the flexible base sheet 46 is made from a composite sheet having a backing layer 48 and a layer of nonwoven fabric 50 bonded to the backing layer 48. The layer of nonwoven fabric 50 is adapted to contact the optical surface of the compact disk to protect the optical surface from scratches. As illustrated in FIG. 3, the backing layer 48 faces the backing sheet 44 and the nonwoven fabric layer 50 faces an overlying first transparent cover sheet 52 disposed thereon.

The first transparent cover sheet 52 extends across the width of the backing sheet 44 and has pocket forming areas 54-1 and 56-1 respectively positioned in the left flap 16 and the right flap 18. The pocket forming areas 54-1 and 56-1 define a first pocket 20-1 and 22-1 in each respective flap 16 and 18, between the flexible base sheet 46 and the first transparent cover sheet 52. Preferably, each of the pocket forming areas 54-1 and 56-1 is shaped at least to conform with a portion of the compact disk.

A first strip of flexible sheet material 58 is disposed over the first transparent cover sheet 52. The first strip of flexible sheet material 58 extends across substantially the entire width of the backing sheet 44 and has a height less than the height of the first transparent cover sheet 52, so that an upper portion of each of the pocket forming areas 54-1 and 56-1 extends beyond the upper edge 59 of the first strip of flexible sheet material 58. The first strip of flexible sheet material 58 is preferably made from the same composite sheet material as the flexible base sheet 46. Therefore, the first strip of flexible sheet material 58 preferably has a backing layer 60 and a layer of nonwoven fabric 62 bonded to the backing layer 60. As illustrated in FIG. 3, the backing layer 60 faces the first transparent cover sheet 52, while the nonwoven fabric layer 62 faces an overlying second transparent cover sheet 64 disposed thereon.

The second transparent cover sheet 64 extends across substantially the entire width of the backing sheet 44 and has pocket forming areas 54-2 and 56-2 respectively positioned in the left flap 16 and the right flap 18. The pocket forming areas 54-2 and 56-2 define second pockets 20-2 and 22-2 between the first strip of flexible sheet 58 the second transparent cover sheet 64. Preferably, each of the pocket forming areas 54-2 and 56-2 is shaped at least to conform with a portion of the compact disk, in a similar manner as the pocket forming areas 54-1 and 56-1. The second transparent cover sheet 64 is preferably substantially identical in shape to the first transparent cover sheet 52.

As illustrated in FIG. 3, the second transparent cover sheet 64 partially overlaps the flexible base sheet 46 and the first strip of flexible sheet 58 and defines the pockets 20-2 and 22-2 therebetween. The nonwoven fabric layers 50 and 62 of the flexible base sheet 46 and the first strip of flexible sheet 58 define a rear interior wall of each of the pockets 20-2 and 22-2, and the second transparent cover sheet 64 defines a front interior wall of the pockets. As a result, when a compact disk is accommodated in each of the pockets 20-2 and 22-2 with the printed surface of the compact disk facing the second transparent cover sheet 64, the entire area of the optical surface of each compact disk comes in contact with the soft nonwoven fabric layers of the rear interior wall of the pockets.

A second strip of flexible sheet material 66 is disposed over the second transparent cover sheet 64. The second strip of flexible sheet 66 material is preferably substantially identical in size and shape to the first strip of flexible sheet material 58. The second strip of flexible sheet material 66 extends across substantially the entire width of the backing sheet 44 and has a height less than the height of the second transparent cover sheet 64, so that an upper portion of each of the pocket forming areas 54-2 and 56-2 extends beyond the upper edge 68 of the second strip of flexible sheet material 66.

The second strip of flexible sheet material 66 is preferably made from the same composite sheet material as the flexible base sheet 46 and the first strip of flexible sheet material 58. The second strip of flexible sheet material 66 is disposed over the second transparent cover sheet 64 in a similar manner that the first strip of flexible sheet material 58 is disposed over the first transparent cover sheet 52. A third transparent cover sheet 70 and a third strip of flexible sheet material 72, a fourth transparent cover sheet 74 and a fourth strip of flexible sheet material 76, and a fifth transparent cover sheet 78 and a fifth strip of flexible sheet material 76 are assembled in the layered formation in a similar manner as that described above.

The flexible base sheet 46, the first to fifth transparent cover sheets 52, 64, 70, 74 and 78 and the first to fifth strip of flexible sheets 58, 66, 72, 76 and 80 are assembled into the layered formation by interlocking tabs and slots, as described below with reference to FIGS. 4-7.

Referring to FIGS. 4-7, each of the transparent cover sheets 52, 64, 70, 74 and 78 has two pairs of tabs 82 and 84. In another embodiment, more or less than four tabs may be provided in each transparent cover sheet. The flexible base sheet 46 has two columns of slits 86, one column defining a plurality of slits 86 in the left flap 16 and a second column defining a plurality of slits 86 in the right flap 18, respectively. The slits 86 are arranged to mate with the tabs 84 of the transparent cover sheets, as shown in FIGS. 4-7. Preferably, each column of slits 86 and the associated interlockable tabs 84 are centrally located with respect to the left flap 16 and the right flap 18, so that the lower bottom peripheral edge portion of each stored compact disk may be supported by a tab interlocked with a slit 86.

Each strip 58, 66, 72, 76 and 80 has a pair of slits 88, one slit in the side of the left flap 16 and one slit in the side of the right flap 18. The interlockable tabs 84 of the respective transparent cover sheets 52, 64, 70, 74 and 78 are positioned to engage with the slits 86 of the flexible base sheets 46, and the interlockable tabs 82 of the respective transparent cover sheets 52, 64, 70, 74 and 78 are positioned to engage with the slits 88 in associated strips of flexible sheets 58, 66, 72, 76 and 80, as shown in FIGS. 4-7.

Figure 5:
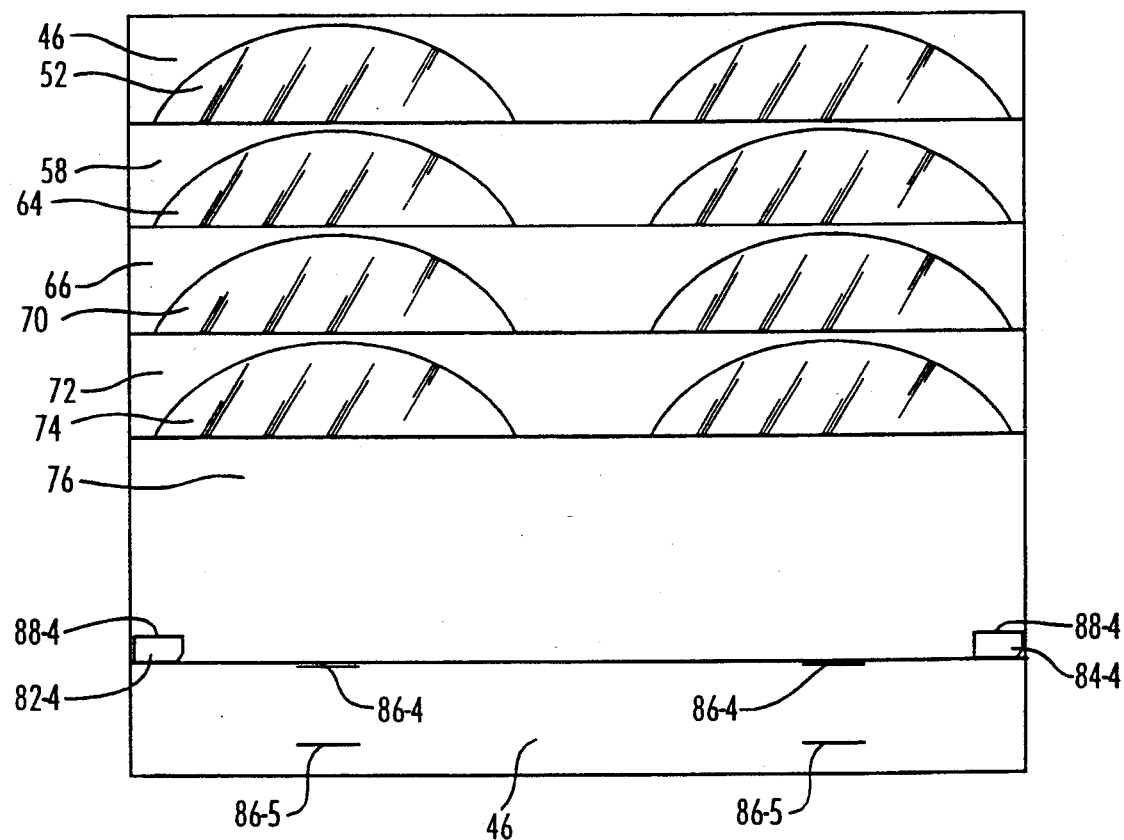
FIG. 5 is a front view illustrating the flexible base sheet and four sets of transparent cover sheets and flexible sheet strips being interlocked with each other in one step of assembling the folding compact disk carrying case of FIG. 1.
Figure 6:
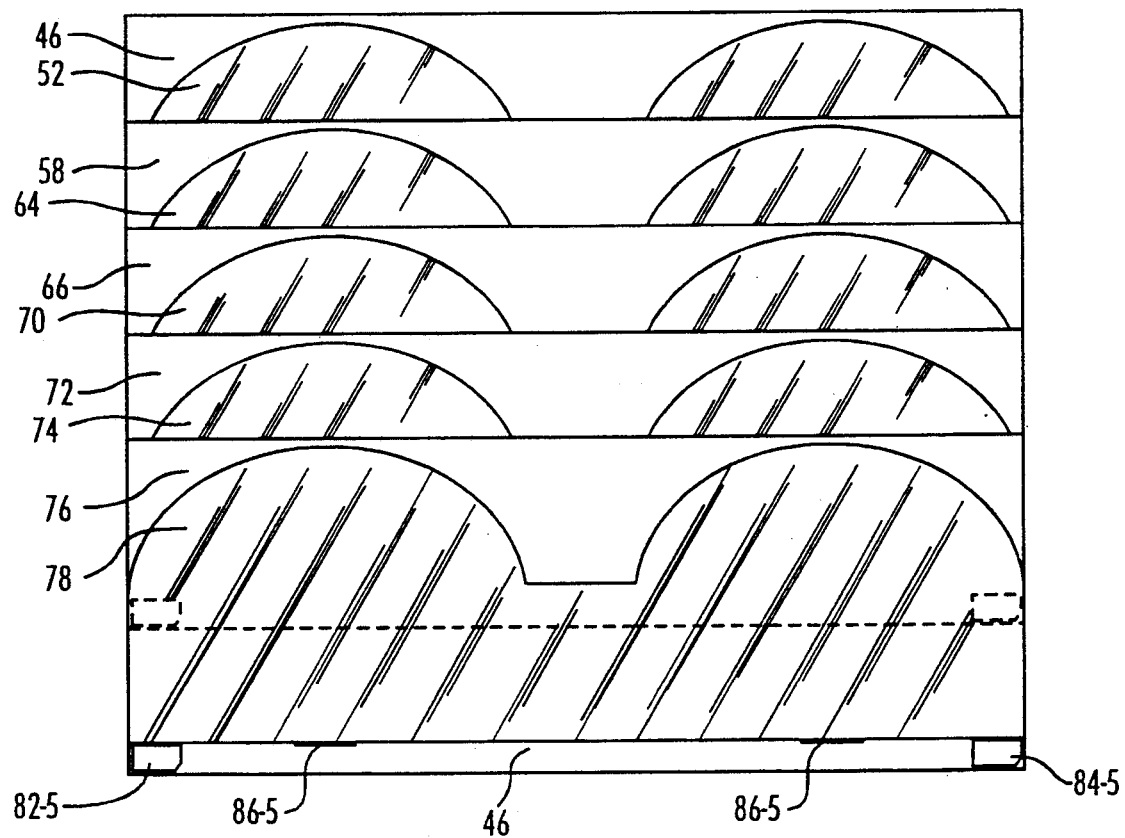
FIG. 6 is a front view illustrating a fifth transparent cover sheet interlocked with the flexible base sheet and covering a part of the fourth flexible sheet strip in one step of assembling the folding compact disk carrying case of FIG. 1.
Figure 7:
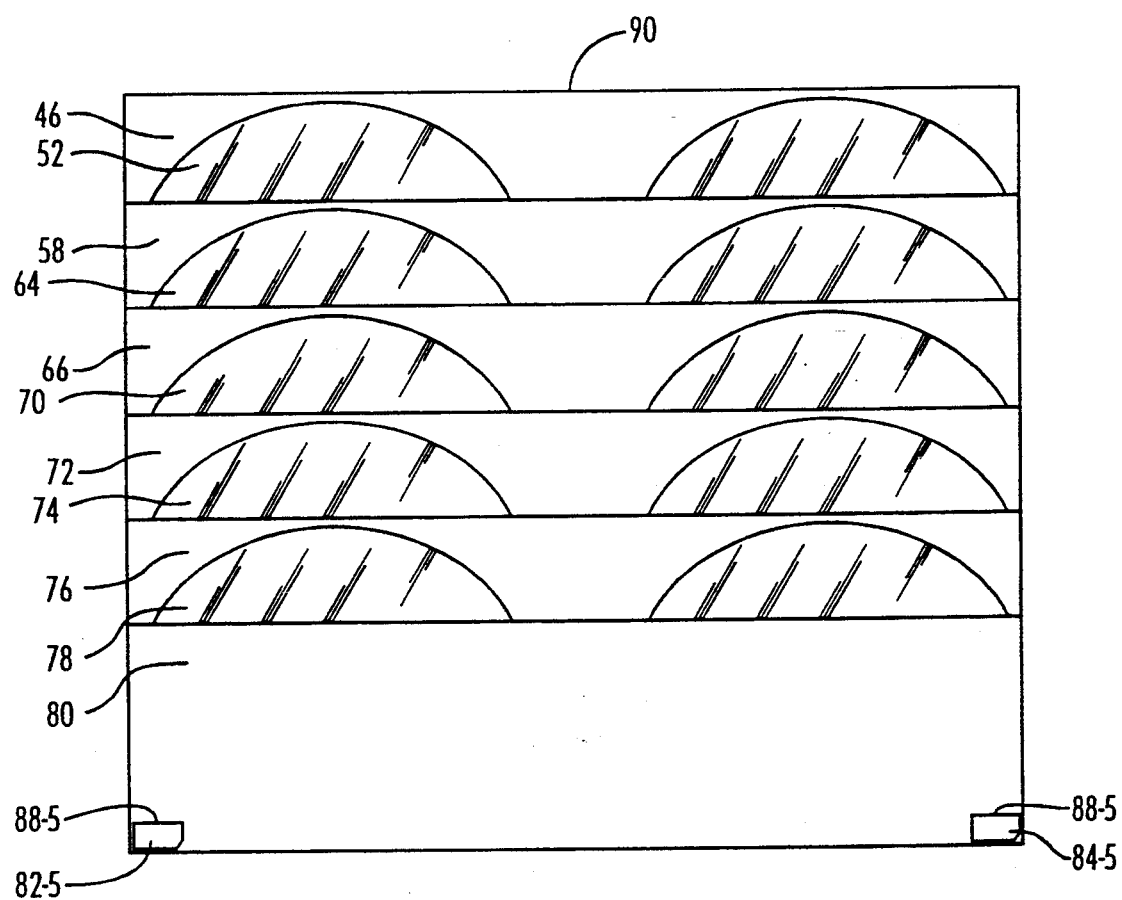
FIG. 7 is a front view illustrating a fifth flexible sheet strip being interlocked with the fifth transparent cover sheet and covering a part of the fifth transparent cover sheet in one step of assembling the folding compact disk carrying case of FIG. 1.

FIG. 5 shows a step in the assembly process, wherein the first to fourth transparent cover sheets 52, 64, 70 and 74, and the first to fourth strips of flexible sheets 58, 66, 72 and 76 have been successively interlocked with each other in the staggered, layered formation. In FIG. 7, the fifth strip of flexible sheet 80 is interlocked with the fifth transparent cover sheet 78 to form an interlocked, staggered, layered assembly 90.

Figure 8:
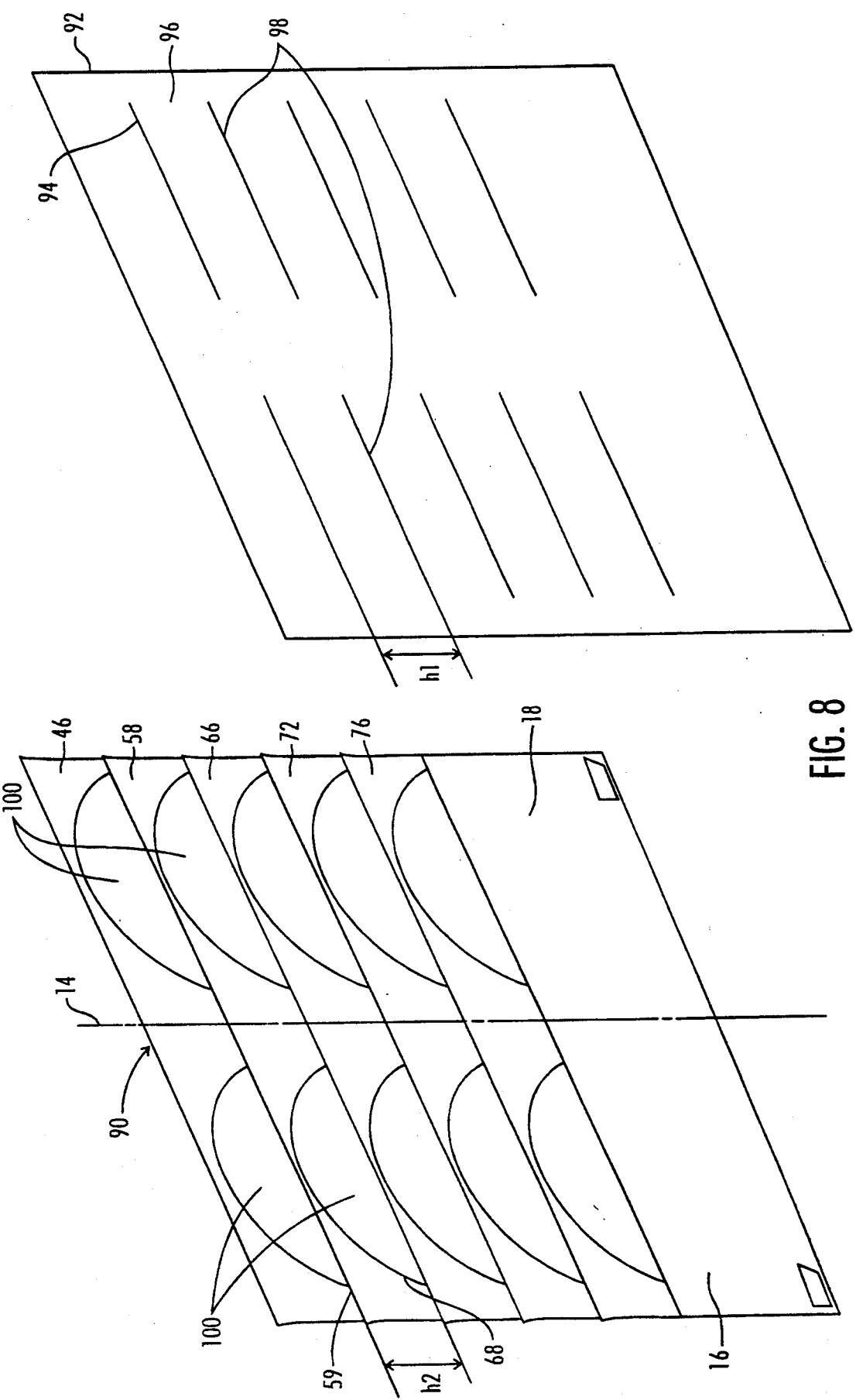
FIG. 8 is a perspective view illustrating the assembled layers of FIG. 7 and a top flexible sheet in one step of assembling the folding compact disk carrying case of FIG. 1.

In FIG. 8, a flexible top sheet 92 is placed over the assembly 90. The flexible top sheet 92 is preferably made of the same type of sheet material as the flexible base sheet 76, such as for example, a composite sheet having a backing layer 94 and a layer of nonwoven fabric 96 bonded to the backing layer 94. The flexible top sheet 92 has an area and size which substantially conforms with that of the assembly 90. Two columns of elongated slits 98 are provided in the flexible top sheet 92, one column in the side of the left flap 16 and another column in the side of the right flap 18.

The flexible top sheet 92 is interlocked with the assembly 90, with the backing layer 94 of the flexible top sheet 92 facing the assembly 90. The slits 98 in each column are substantially equally spaced from each other by a distance h1. The distance h1 is approximately equal to the separation h2 between top edges (e.g., 59 and 68) of two of adjacent strips of flexible sheets (e.g., 58 and 66) in the assembly 90. Therefore, the portions 100 of the respective transparent cover sheets 52, 64, 70, 74 and 78 extending beyond the respective top edge of the strips 58, 66, 72, 76 and 80 are positioned to pass through the associated slits 98 of the flexible top sheet 92.

Figure 9:
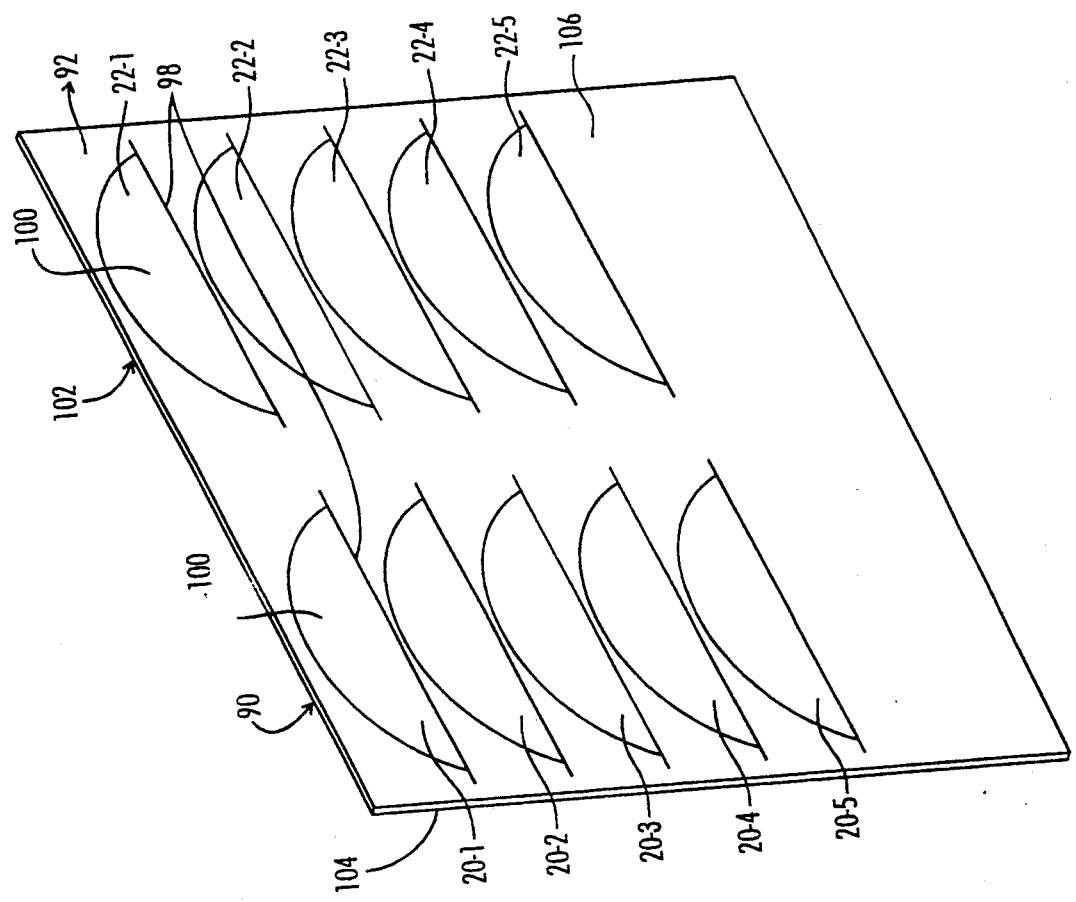
FIG. 9 is a perspective view illustrating the assembled layers of FIG. 8 and a backing sheet in one step of assembling the folding compact disk carrying case of FIG. 1.
Figure 9:
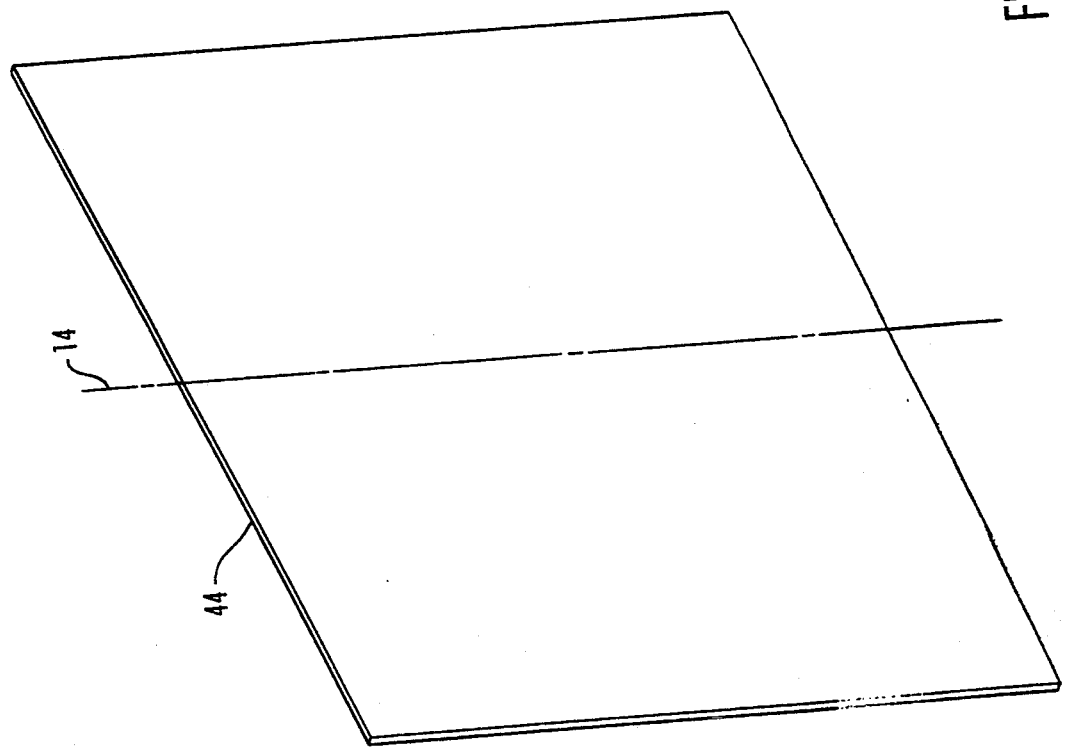

In this manner, when the flexible top sheet 92 is secured to the assembly 90, the exposed portions 100 of the respective transparent cover sheets pass through the slits 98 and are disposed adjacent the nonwoven fabric layer 96 of the flexible top sheet 92, to form a layered assembly 102 as shown in FIG. 9. The layered assembly 102 has a rear face 104 and a front face 106. The front face 106 defines disk-receiving pockets 20-1 to 20-5 and 22-1 to 22-5.

As illustrated in FIG. 9, the backing sheet 44 is generally rectangular in shape and has an area and size which substantially conforms with that of the layered assembly 102. The layered assembly 102 and the backing sheet 44 are arranged with the rear surface 104 of the layered assembly 102 in contact with the backing sheet 44. In this arrangement, a single bonding step may be employed for securing all of the layered materials together. For example, in preferred embodiments, the layered assembly 102 and backing sheet 44 are sewn together in a single stitching operation, to form stitches 108 adjacent the periphery of the backing sheet 44 and along the central folding line 14, as best shown in FIG. 1. In further embodiments, other suitable bonding means may be employed, such as rivets, staples, or the like. Thus, the disk storage case may be manufactured according to a relatively simple process comprising, cutting sheets of materials to be layered into desired patterns, arranging the patterned layers and interlocking the tabs and slots in adjacent layers to form a layered assembly, and stitching (or otherwise bonding) the layered assembly in a single stitching (or other bonding) operation.

From the above discussion, it is apparent that embodiments of the present invention provide a unique folding compact disk carrying case, which is compact in size, yet provides the capability of storing a plurality of disks while allowing a user to view the printed surface of each stored disk at a glance and readily retrieve a desired disk. Embodiments described herein are provided with multiple layers of relatively soft and flexible sheets which, in combination, tend to absorb shock and protect stored disks from dust, scratches or other damaging environmental factors. Moreover, a unique design of the individual layers allows the layers to be readily assembled and bonded together, with a single stitching (or other suitable bonding) operation.

It will, of course, be understood that modifications of the present invention, in its various aspects will be apparent to those skilled in the art, some being apparent only after study and other being matters of routine mechanical design. For example, the upper hook and loop pads 26 and 28 and the lower hook and loop pads 32 and 34 may be replaced by or combined with any suitable securing means, such as, snaps, tie straps, buckles, magnet assemblies, zipper assemblies, or the like. As such, the scope of the invention should not be limited by the particular embodiment herein described, but should be defined by the appended claims and equivalents thereof.

I claim:

1. A rectangular folding compact disk case for storing a plurality of compact disks each having a predetermined diameter, an optical surface and a printed surface, the folding compact disk case comprising:
   a backing sheet having a folding line about a center thereof to thereby define a left interior face and a right interior face, the left and the right interior faces opposing each other in a closed position;
   a surface layer of nonwoven fabric disposed on each of the left and right interior faces, the surface layer defining therein an opening; and
   at least a first pocket provided between the backing sheet and the surface layer of the left interior face and accessible through the opening for storing a first compact disk;
   at least a second pocket provided between the backing sheet and the surface layer of the right interior face and accessible through the opening for storing a second compact disk, the first and second pockets opposing each other in the closed position;
   each of the first and second pockets having a predetermined depth shorter than the predetermined diameter of each compact disk to allow a portion of the compact disk to be extended outside each of the first and second pockets;
   each of the first pocket and the second pocket having an interior contact layer of nonwoven fabric for contacting the optical surface of the compact disk and an interior front layer opposing the interior contact layer;
   the interior front layer having a tab extending outside each of the first and second pockets and having a surface area to cover and protect the portion of the compact disk extending outside each of the first and second pockets.

2. A rectangular folding compact disk case according to claim 1, wherein the tab is made from a flexible transparent plastic material to allow a visual inspection of the printed surface of the compact disk.

3. A rectangular folding compact disk case according to claim 1, further including an upper edge, a lower edge opposing the upper edge, and a pair of fastener devices for closing the left internal face and the right internal face, the pair of fastener devices being provided adjacent each two corners of the upper edge and the lower edge and positioned so as to interfere with each compact disk to thereby prevent each compact disk from slipping out of each of the pockets in the closed position.

4. A rectangular folding compact disk case according to claim 3, wherein the pair of fastener devices extend along each of the upper edge and the lower edge respectively by a predetermined length so that the pair of fastener devices closes the upper edge and the lower edge in the folded position and leaves an opening along each of the folded upper edge and the lower edge narrower than the diameter of each compact disk.

5. A rectangular folding compact disk case according to claim 1, further comprising:
   a plurality of openings in the surface layer of the left interior face, and a corresponding number of plurality of first pockets provided between the backing sheet and the surface layer of the left interior face and accessible through the respective openings for storing compact disks;
   a plurality of openings in the surface layer of the right interior face, and a corresponding number of plurality of second pockets provided between the backing sheet and the surface layer of the right interior face and accessible through the respective openings for storing compact disks, the plurality of first and second pockets opposing each other in the closed position;
   each of the plurality of first and second pockets having a predetermined depth shorter than the predetermined diameter of each compact disk to allow a portion of the compact disk to be extended outside each of the plurality of first and second pockets;

each of the plurality of the first and second pockets having an interior contact layer of nonwoven fabric for contacting the optical surface of the compact disk and an interior front layer opposing the interior contact layer;

the interior front layer having a tab extending outside each of the first and second pockets and having a surface area to cover and protect the portion of the compact disk extending outside each of the first and second pockets.

6. A rectangular folding compact disk case according to claim 5, wherein the tab is made from a flexible transparent plastic material to allow a visual inspection of the printed surface of the compact disk.

7. A rectangular folding compact disk case according to claim 5, further including an upper edge, a lower edge opposing the upper edge, and a pair of fastener devices for closing the left internal face and the right internal face, the pair of fastener devices being provided adjacent each the two corners of the upper edge and the lower edge, and wherein the pair of fastener devices extend along each of the upper edge and the lower edge respectively by a predetermined length so that the pair of fastener devices closes the upper edge and the lower edge in the folded position and leaves an opening along each of the folded upper edge and the lower edge narrower than the diameter of each compact disk.

8. A compact disk case for storing a plurality of compact disks each having an optical surface and a printed surface, the compact disk case comprising:
    a backing sheet having a surface;
    a flexible base sheet having a front contact surface capable of contacting the optical surface of the compact disk and a rear surface, the flexible base sheet defining therein a plurality of slits and being disposed on the backing sheet with the rear surface thereof facing the surface of the backing sheet;
    a first transparent cover sheet disposed over the flexible base sheet to define a first pocket between the flexible base sheet and the first transparent cover sheet for receiving a compact disk therein, the transparent cover sheet having at least first and second interlockable tabs, the first tab being interlockable with a first one of the plurality of slits in the flexible base sheet; and
    a first strip of flexible sheet having a front contact surface capable of contacting the optical surface of the compact disk and a rear surface, the first strip of flexible sheet being disposed on the first transparent cover sheet with the rear surface thereof facing the first transparent cover sheet, the first strip of flexible sheet defining therein a slit being interlockable with the second interlockable tab of the first transparent cover sheet.

9. A compact disk case according to claim 8 further comprising:
    a second transparent cover sheet disposed over the first strip of flexible base sheet and the flexible base sheet to define a second pocket between the first strip of flexible sheet and the flexible base sheet and the second transparent cover sheet for receiving a compact disk therein, the second transparent cover sheet having at least third and fourth interlockable tabs, the third tab being interlockable with a second one of the plurality of slits in the flexible base sheet; and
    a second strip of flexible sheet having a front contact surface capable of contacting the optical surface of the compact disk and a rear surface, the second strip of flexible sheet being disposed over the second transparent cover sheet with the rear surface thereof facing the second transparent cover sheet, the second strip of flexible sheet defining therein a slit being interlockable with the fourth interlockable tab of the second transparent cover sheet.

10. A compact disk case according to claim 9, wherein the first and second transparent cover sheets are substantially identical in shape to each other, and wherein the first and second strips of flexible sheet are substantially identical in shape to each other.

11. A compact disk case according to claim 10, wherein each compact disk has a predetermined diameter and each of the first and second transparent cover sheets has a width substantially equal to the diameter of each compact disk, and wherein each of the first and the second strips of flexible sheet has a width narrower than the width of each of the first and second transparent cover sheets to allow an upper portion of each of the first and the second transparent cover sheets to be exposed.

12. A compact disk case according to claim 11 further including a top flexible sheet having a rear surface and a front contact surface capable of contacting the optical surface of the compact disk, the top flexible sheet covering the front contact surfaces of the flexible base sheet, the first strip of flexible sheet and the second strip of flexible sheet with the rear surface thereof opposing the front contact surfaces of the flexible base sheet, the first strip of flexible sheet and the second strip of flexible sheet, the top flexible sheet defining therein a plurality of slots each allowing the exposed upper portion of each of the first and second transparent cover sheets to pass therethrough so that the exposed upper portion of each of the first and second transparent cover sheets is disposed on the front contact surface of the top flexible sheet.

13. A compact disk case according to claim 11, wherein the flexible sheet comprises a composite sheet having a nonwoven fabric layer at the front contact surface bonded to a backing sheet at the rear surface.

14. A compact disk case for storing a plurality of compact disks each having an optical surface and a printed surface, the compact disk case comprising:
    a generally rectangular backing sheet having a surface and a folding line about a center thereof to define a left side wall and a right side wall;
    a flexible base sheet having a front contact surface capable of contacting the optical surface of the compact disk and a rear surface, the flexible base sheet covering an entire area of the surface of the backing sheet with the rear surface thereof facing the surface of the backing sheet and defining therein a plurality of pairs of slits respectively positioned in the left side wall and the right side wall;
    a first transparent cover sheet disposed on and extending across a substantially entire width of the flexible base sheet to define a first pair of pockets positioned respectively on the left side wall and on the right side wall between the flexible base sheet and the first transparent cover sheet for receiving a compact disk in each of the pockets, the transparent cover sheet having at least two pairs of first and second interlockable tabs positioned respectively on the left side wall and the right side wall, the first tabs being interlockable with a first set of two of the plurality of slits in the flexible base sheet; and a first strip of flexible sheet having a front contact surface capable of contacting the optical surface of the compact disk and a rear surface, the first strip of flexible sheet being disposed on and extending across a substantially entire width of the first transparent cover sheet with the rear surface thereof facing the first transparent cover sheet, the first strip of flexible sheet defining therein at least two slits respectively positioned on the left side wall and right side wall being interlockable with the second tabs of the first transparent cover sheet.

15. A compact disk case according to claim 14 further comprising:

a second transparent cover sheet disposed over the first strip of flexible sheet and the flexible base sheet to define a second pair of pockets positioned respectively on the left side wall and the right side wall between the first strip of flexible sheet and the flexible base sheet and the second transparent cover sheet for receiving a compact disk in each of the pockets, the second transparent cover sheet having at least two pairs of third and fourth interlockable tabs positioned respectively on the left side wall and the right side wall, the third tabs being interlockable with a second set of the plurality of slits in the flexible base sheet; and a second strip of flexible sheet having a front contact surface capable of contacting the optical surface of the compact disk and a rear surface, the second strip of flexible sheet being disposed on and extending across a substantially entire width of the second transparent cover sheet with the rear surface thereof facing the second transparent cover sheet, the second strip of flexible sheet defining therein at least two slits respectively positioned on the left side wall and right side wall being interlockable with the second tabs of the first transparent cover sheet.

16. A compact disk case according to claim 15, wherein each compact disk has a predetermined diameter and each of the first and second transparent cover sheets has a width substantially equal to the diameter of each compact disk, and wherein each of the first and the second strips of flexible sheet has a width narrower than the width of each of the first and second transparent cover sheets to allow an upper portion of each of the first and the second transparent cover sheets to be exposed.

17. A compact disk case according to claim 16 further including a top flexible sheet having a rear surface and a front contact surface capable of contacting the optical surface of the compact disk, the top flexible sheet covering the front contact surfaces of the flexible base sheet, the first strip of flexible sheet and the second strip of flexible sheet with the rear surface thereof opposing the front contact surfaces of the flexible base sheet, the first strip of flexible sheet and the second strip of flexible sheet, the top flexible sheet defining therein a plurality of pairs of slots positioned respectively on the left side wall and the right side wall, each pair allowing the exposed upper portions of each of the first and second transparent cover sheets to pass therethrough so that the exposed upper portions of each of the first and second transparent cover sheets are disposed on the front contact surface of the top flexible sheet.

18. A compact disk case according to claim 17, wherein the rectangular backing sheet, the flexible base sheet, the first transparent cover sheet, the first strip of flexible sheet, the second transparent cover sheet, the second strip of flexible sheet and the top flexible sheet stitched together adjacent a perimeter of the rectangular backing sheet and along the folding line.

19. A method of making a compact disk case for storing a plurality of compact disks each having an optical surface and a printed surface, the method comprising the steps of:

preparing a flexible base sheet having a rear surface and a front contact surface capable of contacting the optical surface of the compact disk, the flexible base sheet defining therein a folding line about a center thereof to define a left side wall and a right side wall and having a plurality of pairs of slits respectively positioned in the left side wall and the right side wall;

disposing a first transparent cover sheet on the flexible base sheet to define a first pair of pockets positioned respectively on the left side wall and on the right side wall between the flexible base sheet and the first transparent cover sheet for receiving a compact disk in each of the pockets, the transparent cover sheet extending across a substantially entire width of the flexible base sheet and having at least two pairs of first and second interlockable tabs positioned respectively on the left side wall and the right side wall;

engaging the first interlockable tabs of the first transparent cover sheet with a first set of two of the plurality of slits in the flexible base sheet;

disposing a first strip of flexible sheet having a rear surface and a front contact surface capable of contacting the optical surface of the compact disk on the first transparent cover sheet with the rear surface thereof facing the first transparent cover sheet, the first strip of flexible sheet extending across a substantially entire width of the first transparent cover sheet and defining therein at least two slits respectively positioned on the left side wall and right side wall; and engaging the second interlockable tabs of the first transparent cover sheet with the at least two slits of the first strip of flexible sheet.

20. A method of making a compact disk case according to claim 19 further comprising the steps of:

disposing a second transparent cover sheet over the first strip of flexible sheet and the flexible base sheet to define a second pair of pockets positioned respectively on the left side wall and the right side wall between the first strip of flexible sheet and the flexible base sheet and the second transparent cover sheet for receiving a compact disk in each of the pockets, the second transparent cover sheet having at least two pairs of third and fourth interlockable tabs positioned respectively on the left side wall and the right side wall;

engaging the third interlockable tabs of the second transparent cover sheet with a second set of the plurality of slits in the flexible base sheet; and disposing a second strip of flexible sheet having a rear surface and a front contact surface capable of contacting the optical surface of the compact disk on the second transparent cover sheet with the rear surface thereof facing the second transparent cover sheet, the second strip of flexible sheet extending across a substantially entire width of the second transparent cover sheet and defining therein at least two slits respectively positioned on the left side wall and right side wall; and engaging the fourth interlockable tabs of the second transparent cover sheet with the at least two slits of the second strip of flexible sheet.

21. A method of making a compact disk case according to claim 20 further comprising the steps of:

disposing a top flexible sheet having a rear surface and a front contact surface capable of contacting the optical surface of the compact disk on the front contact surfaces of the flexible base sheet, the first strip of flexible sheet and the second strip of flexible sheet with the rear surface thereof opposing the front contact surfaces of the flexible base sheet, the first strip of flexible sheet and the second strip of flexible sheet, the top flexible sheet defining therein a plurality of pairs of slits positioned respectively on the left side wall and the right side wall; and allowing exposed upper portions of the first and second transparent cover sheets to pass through the associated slits of the top flexible sheet so that the exposed upper portions of the first and second transparent cover sheets are disposed on the front contact surface of the top flexible sheet to define a set of interlocked layers.

22. A method of making a compact disk case according to claim 21 further comprising the steps of:

disposing the set of interlocked layers on a generally rectangular backing sheet having a surface with the rear surface of the flexible base sheet facing and covering the entire surface of the rectangular backing sheet; and stitching the interlocked layers and the backing sheet together adjacent a periphery of the backing sheet and along the folding line about the center.

23. A compact disk carrying case for storing a plurality of compact disks each having a predetermined diameter, the compact disk carrying case comprising:

a rectangular member having therein a central folding line to define a left flap and a right flap;

a first set of plurality of pockets provided on an internal surface of the left flap;

a second set of plurality of pockets provided on an internal surface of the right flap, the first set and second set of pockets opposing each other in a closed position;

wherein each of the pockets has an opening and a depth shorter than the diameter of each of the compact disks to allow a top portion of each of the compact disks to extend beyond the opening; and a transparent flexible sheet connected to a lip of each of the pockets for covering the top portion of each of the compact disks extended beyond the opening of each of the pockets.

24. A compact disk carrying case according to claim 23, wherein the plurality of pockets in each of the left and right flaps are arranged so that the transparent flexible sheet is not covered by any one of the pockets in an open position.

* * * * *